Jan. 20, 1970  G. T. BALTUS  3,490,339
TORSIONAL MECHANICAL INPUT SIGNAL APPARATUS
Filed May 1, 1968  2 Sheets-Sheet 1

INVENTOR.
GEORGE T. BALTUS
BY
Nilsson, Robbins & Anderson
ATTORNEYS

INVENTOR.
GEORGE T. BALTUS
BY
Nilsson Robbins & Anderson
ATTORNEYS

_United States Patent Office_

3,490,339
Patented Jan. 20, 1970

3,490,339
TORSIONAL MECHANICAL INPUT SIGNAL APPARATUS
George T. Baltus, Tonawanda, N.Y., assignor to Bell Aerospace Corporation, a corporation of Delaware
Filed May 1, 1967, Ser. No. 635,213
Int. Cl. F01b 1/00; F15b 13/15, 13/16
U.S. Cl. 91—186                                       4 Claims

ABSTRACT OF THE DISCLOSURE

This specification discloses a hydraeric servo valve apparatus which controls through a multi-stage valve the flow of hydraeric fluid to an actuator mechanism. A mechanical input signal is applied to the servo valve by means of a torsionally responsive member connected to the input signal receiving portion of the servo valve. In a specific application disclosed, the actuator which is connected to the output stage of the servo valve moves a rotatable motion transmitting device such as a rod which may be connected to any utilizing apparatus such as the control surface of a vehicle. One end of a torsion rod is also connected to this rotatable motion transmitting device and the other end of the torsion rod is connected to the input signal receiving portion of the servo valve which may be the armature thereof. Thus as the motion transmitting device is moved by the output actuator an input signal is applied through the torsion rod to the servo valve. In this specific example, the mechanical input signal is in the form of a feedback signal.

---

This invention relates generally to hydraeric control systems and more particularly to apparatus for applying a mechanical input signal to the control valve in such a system. More specifically, such apparatus is a spring member connected in such a manner to apply a torsional input signal to the torque motor armature, or to the flapper or jet pipe suspension means of a servo valve and may, for example, be used in a mechanical feedback arrangement.

BACKGROUND OF THE INVENTION

In the prior art it is often desirable to provide mechanical input signals to a servo valve both as direct input signals and as feedback signals for various purposes. This has been accomplished traditionally through the utilization of mechanical linkages, movable cams and cam followers, direct connections by way of springs and bellow or similar such apparatus. In virtually all presently known cases, such apparatus is relatively complex in operation and adds substantial weight to the servo valve mechanism. Since such apparatus is substantial in weight, the reflected mass thereof will often put additional loads on the torque motor of the servo valve and will also cause the armature of the servo valve to become quite sensitive to lateral acceleration forces and vibrational forces applied thereto. Also in those instances wherein a mechanical feedback signal is applied from the load to the servo valve it has been traditional to divide the stroke of the output mechanism downwardly so that a relatively small amount of motion is applied to the servo valve as compared to the actual motion of the load or actuator member. This therefore requires stroke reduction mechanisms which in the overall analysis add backlash, friction, weight, and further reflected mass which in many instances is undesirable.

OBJECTS OF THE INVENTION

Accordingly, it is an object of the present invention to provide mechanical input signal apparatus for connection with a servo valve in a hydraeric control system which apparatus is extremely light in weight and reflected mass, which minimizes load and stress on the servo valve, and which is insensitive to lateral acceleration and vibration.

It is another object of the present invention to provide a mechanical input signal apparatus for use with a hydraeric servo valve control system which apparatus is extremely compact in structure, reduces friction and backlash to a minimum, yet is rugged and simple in construction and maintains a high degree of versatility.

BRIEF DESCRIPTION OF THE DRAWING

Additional objects and advantages of a mechanical input signal hydraeric servo valve apparatus constructed in accordance with the present invention will become apparent from a consideration of the following description taken in conjunction with the accompanying drawings which are presented by way of example only and are not intended as a limitation upon the scope of the present invention as defined in the accompanying claims and in which:

SUMMARY OF THE INVENTION

A hydraeric positioning apparatus in accordance with the present invention includes a servo valve means which is sensitive to mechanical input signals and in response thereto controls the flow of hydraeric fluid to an actuator means which is connected thereto by the usual fluid conducting means or passageways. A rotatably supported motion transmission means has a torsion rod interconnected between it and the input signal receiving portion of the servo valve means to apply a torsional mechanical input signal to the servo valve means to control the flow of hydraeric fluid therethrough.

DESCRIPTION OF THE PREFERRED EMBODIMENT

Figure 1:
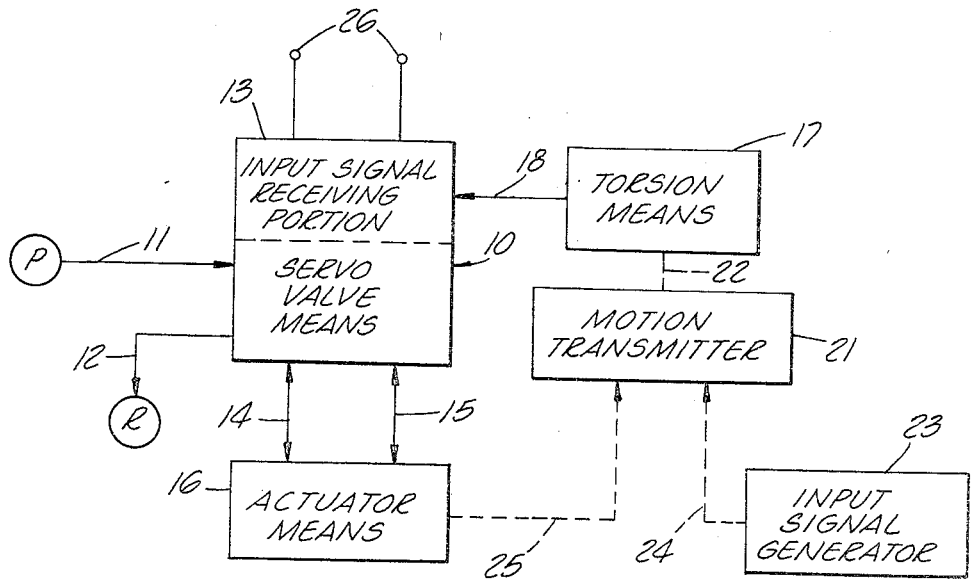
FIGURE 1 is a schematic representation in block form of a hydraeric control system employing a mechanical input signal apparatus constructed in accordance with the present invention.

Referring now to the drawings for a better understanding of the present invention, and particularly to FIGURE 1 thereof, a block diagram in schematic form of a system in accordance with the present invention is illustrated. As is therein shown, a servo valve means 10 is utilized to control the flow of hydraeric fluid from a source P thereof through a conduit 11 which is connected to the servo valve means 10. A conduit 12 interconnects the servo valve means with the return R as is well known in the art. The flow of fluid through the servo valve means 10 is controlled by signals applied to an input signal receiving portion 13 so that fluid flows through the passageway or conduit means 14 and 15 to an actuator means 16.

Signals applied to the input signal receiving portion 13 of the servo valve means 10 may take any form desired but in accordance with the present invention a torsion means 17 is connected as shown at 18 to the input signal receiving portion 13 thereby to apply a mechanical input signal to the servo valve means. A motion transmitter is connected as shown by dashed line 22 to the torsion means 17 to activate the same. The motion transmitter 21 may receive its input energy from an input signal generator 23 as illustrated by the dashed line 24. Under such conditions the input signal generator would apply input signals through the interposed mechanism of the motion transmitter 21 and the torsion means 17 to the input signal receiving portion to effect any given desired flow of fluid. However, alternatively, the motion transmitter may be connected as illustrated by the dashed line 25 to the actuator means 16. Under these conditions the torsion means 17 would apply a signal by way of the line 18 as a feedback signal to the input signal receiving portion of the servo valve means. Typically such a feedback signal, particularly mechanical in nature, would be a negative feedback signal stabilizing the operation of the servo valve means. It should, of course, be understood that signals may emanate simultaneously from the actuator means 16 and the input signal generator 23. Under such conditions a summing mechanism of any type well known to the art may be included in the motion transmitter 21 or other apparatus for obvious purposes. The input signal receiving portion 13 of the servo valve 10 may include a torque motor to which electrical signals may be applied as indicated by way of the leads 26 extending therefrom.

Figure 2:
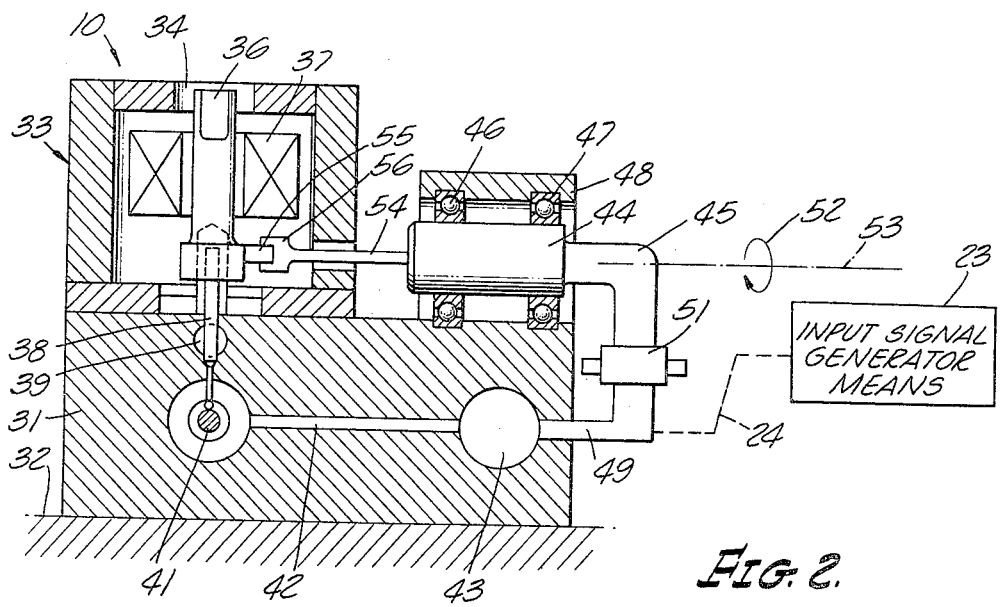
FIGURE 2 is a schematic representation of one form of a hydraeric control system employing a torsional input signal apparatus constructed in accordance with the present invention.

By reference now to FIGURE 2 a schematic representation of one form of the present invention is illustrated. As is shown, a base 31 is attached to a given operating mechanism 32 and supported thereupon. A housing 33 has positioned therein a torque motor which in the present instance includes pole pieces, one of which is shown at 34, an armature member 36 interposed therebetween, and a coil 37 for receiving electrical input signals. Upon application of signals to the torque motor a flapper 38 changes position with respect to nozzles one of which is shown at 39 thereby to manipulate the position of a spool valve 41 which in turn controls the flow of hydraeric fluid through passageways as shown at 42 to an actuator means 43. Construction and operation of a servo valve means as illustrated and generally described above is more fully disclosed in U.S. Patent 3,221,760 taken in conjunction with U.S. Patent 2,947,286 and therefore a more detailed explanation is not deemed necessary at this point.

A motion transmitter in the form of a rotatable rod 44 having an arm 45 extending therefrom is mounted upon bearings 46 and 47 within a housing 48 which is supported upon the base 31. Motion generating means in the form of a mechanical arm 49 is connected between the actuator 43 and the arm 45 by connector means such as a coupling member 51. Alternatively or in conjunction, an input signal generator means 23 may be connected as shown by the dashed line 24 to the motion generating means 49 which may require a summing mechanism for example in the coupling member 51. In either event, the motion generating means is caused to rotate upon the bearings 46 and 47 as shown by the arrow 52 about the axis 53. A torsion rod means 54 is rigidly connected to the motion transmitting means 44–45 and is also connected to the armature 36 at substantially the pivot point thereof by way of an extension 55 affixed thereto to which the end 56 of the torsion rod 54 is attached.

From the foregoing description it can therefore be seen that as the motion generating means consisting of either the arm 49 or the connection 24 moves in response to applications of force thereto, the motion transmission means rotates upon the bearings 46 and 47 thereby creating a rotating or twisting movement. This rotating or twisting movement is imparted to the torsion rod 54 which in turn causes the twisting or pivoting motion to be applied to the flapper 38 thereby constituting a mechanical input signal to the servo valve 10.

Figure 3:
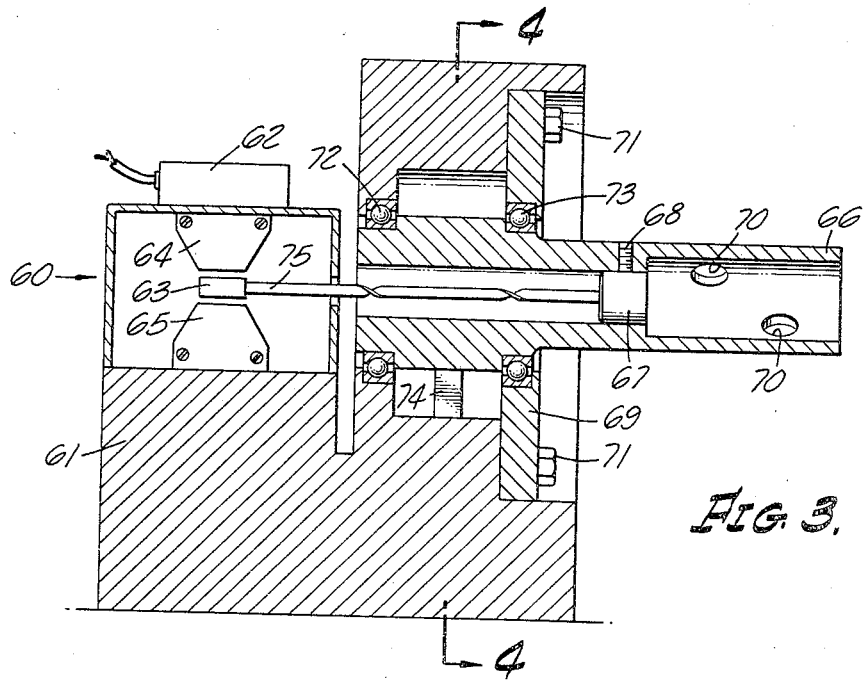
FIGURE 3 is an elevational view of apparatus constructed in accordance with the present invention illustrating one form of mechanical feedback apparatus employing a torsional member constructed in accordance with the present invention.
Figure 4:
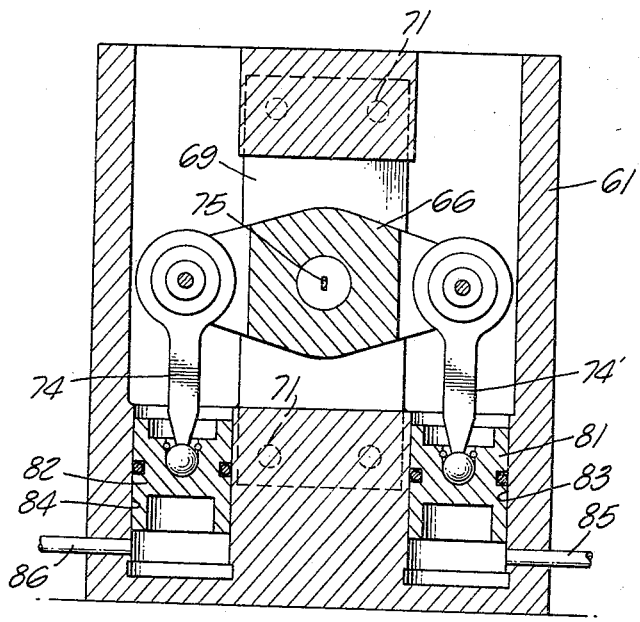
FIGURE 4 is a view of a portion of the apparatus of FIGURE 3 taken about the lines 4—4 thereof.

By reference to FIGURES 3 and 4 there is illustrated one specific form which a system in accordance with the present invention may take. As is therein illustrated, a servo valve 60 is supported upon a body 61. Electrical input signals may be applied to the coils 62 which operate in conjunction with the pole pieces 64 and 65 to effect movement of a T-bar type armature 63. Movement of the armature 63 transmits motion to a flapper which in turn controls movement of a spool valve and in turn positioning of an actuator as above described. Movement of the actuator rotates a motion generating means such as an output shaft 66. The output shaft 66 may be connected by way of the openings 70 provided therein to any utilizing apparatus desired. Connector means such as a stub shaft 67 is held in position upon the output shaft 66 by means of a set screw or similar structure 68. The output shaft 66 in turn is held in place by a plate 69 which is secured to the body 61 by screws or bolts 71 and within which bearings 73 are supported along with the bearings 72 supported by the body 61. Motion is transmitted from the actuator to the output shaft 66 by means of connecting rods 74. As the output shaft 66 is rotated, the rotative motion is transmitted or coupled through the stub shaft 67 to a torsion member which is in the form of a torsion spring 75 that is connected to the pivot point of the armature 63, for example, the center part of the T-bar, and thereby applies an input mechanical signal thereto.

The actuator, more specifically shown in FIGURE 4, takes the form of a pair of pistons 81, 82 mounted respectively in cylinders 83 and 84. Passageway or conduit means 85 and 86 are connected to transmit fluid from the servo valve 60 to the respective cylinders 83 and 84 to cause movement of the pistons 81 and 82. As the pistons 81 and 82 reciprocate within their respective cylinders, the rods 74 and 74' transmit motion to the output shaft 66 which motion is in turn transmitted to the utilizing apparatus. Also the torsion spring 75 receives motion from the output shaft 66 and transmits it to the armature 63 of the torque motor as above described.

From the foregoing description and illustrations, it can be recognized that there is provided in accordance with the present invention a rugged and simple mechanical input apparatus which utilizes the torsional windup of a spring member to thus accomplish motion reduction without the usual backlash, frictional problems and complex design in the usual stroke reduction mechanisms. Although a torsional spring has been shown as a spiral or flat spring, it should be understood that it may take any form desired such as a tube, spiral, helical, round, or any other desired configuration. It will further be recognized that a high impedance type force summing is obtained and that the very light weight of the torsional spring results in a reflected mass which is minimal as sensed by the armature. This small reflected mass of torsional spring can be located at or near the center of gravity in the sensing plane of the armature, thus causing a high degree of insensitivity to lateral acceleration and vibration to which the apparatus may be subjected in normal application.

What is claimed is:

1. Hydraeric positioning apparatus comprising:
    a servo valve means having an input signal receiving portion including an armature-flapper means pivotal about a pivot point for controlling the flow of hydraeric fluid in response to input signals applied to said input signal receiving portion;
    an actuator means adapted for coupling to a member to be positioned;
    fluid conducting means interconnecting said servo valve means and said actuator means for transporting hydraeric fluid to said actuator to move said actuator;
    rotary motion transmission means rotably supported;
    torsion rod means connected between said rotary motion transmission means and said pivot point of said armature-flapper means for conducting the rotary motion of said rotary motion transmission means as a mechanical input signal to said servo valve means; and connector means interconnecting said rotary motion transmission means to said actuator means for imparting rotary motion to said rotary motion transmission means and through said torsion rod means as a mechanical signal to said servo valve only upon movement of said actuator means, said mechanical signal being a feedback signal.

2. Hydraeric apparatus as defined in claim 1 which includes a rotatable shaft connected to said actuator adapted for connection to utilizing apparatus, said torsion rod means being connected to said shaft, the axis of rotation of said shaft and said torsion rod means being coincident.

3. Hydraeric apparatus as defined in claim 1 wherein said motion transmission means is a rotatable cylinder having a crank arm extending therefrom, said actuator being connected to said crank arm.

4. Hydraeric apparatus as defined in claim 1 in which said torsion rod means is a spring member.

References Cited

UNITED STATES PATENTS

| | | | |
|---|---|---|---|
| 2,947,286 | 8/1960 | Baltus et al. | 91—387 |
| 2,988,059 | 6/1961 | Wysung | 91—375 |
| 3,273,465 | 9/1966 | Eddy | 91—375 |
| 3,282,283 | 11/1966 | Takeda | 91—3 |
| 3,095,002 | 6/1963 | Healy | 137—625.64 |
| 2,940,699 | 6/1960 | Plummer. | |

PAUL E. MASLOUSKY, Primary Examiner

U.S. Cl. X.R.

91—367, 387, 459; 137—625.62, 625.63, 625.64